June 28, 1960     W. W. JOHNSON ET AL     2,942,371
DUAL-PURPOSE MIDWATER-BOTTOM OTTERBOARD
Filed Sept. 25, 1958     2 Sheets-Sheet 2
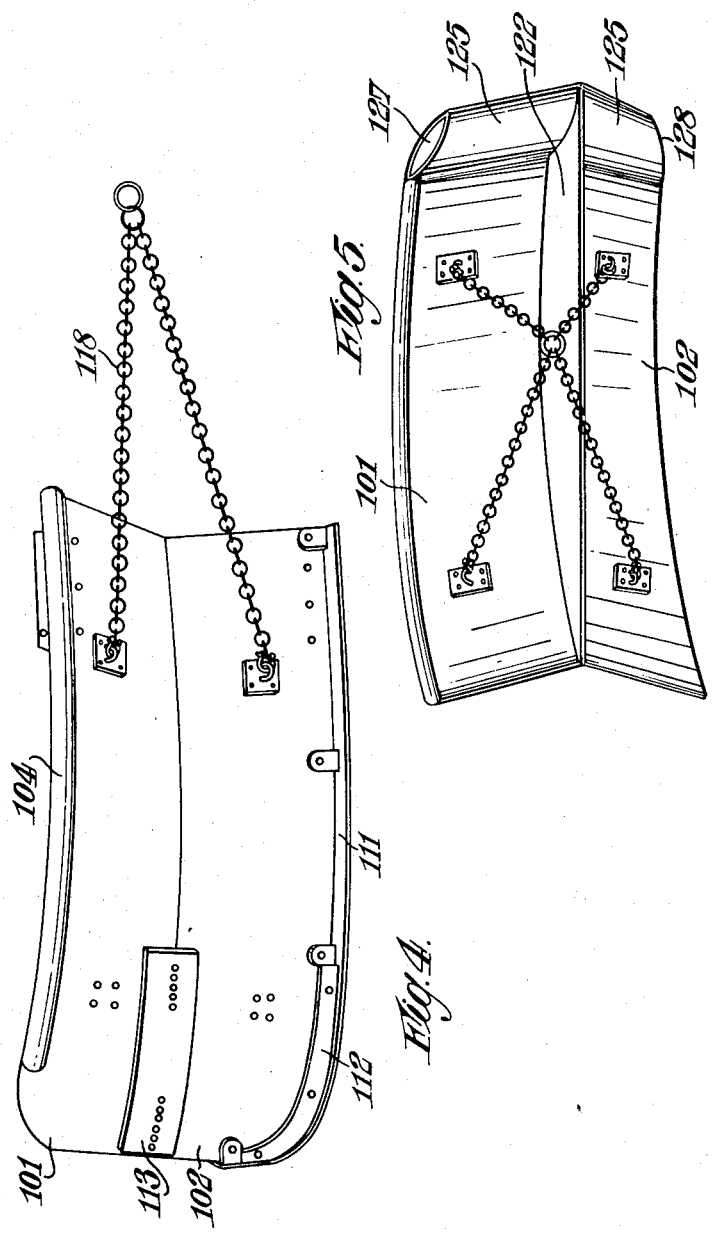

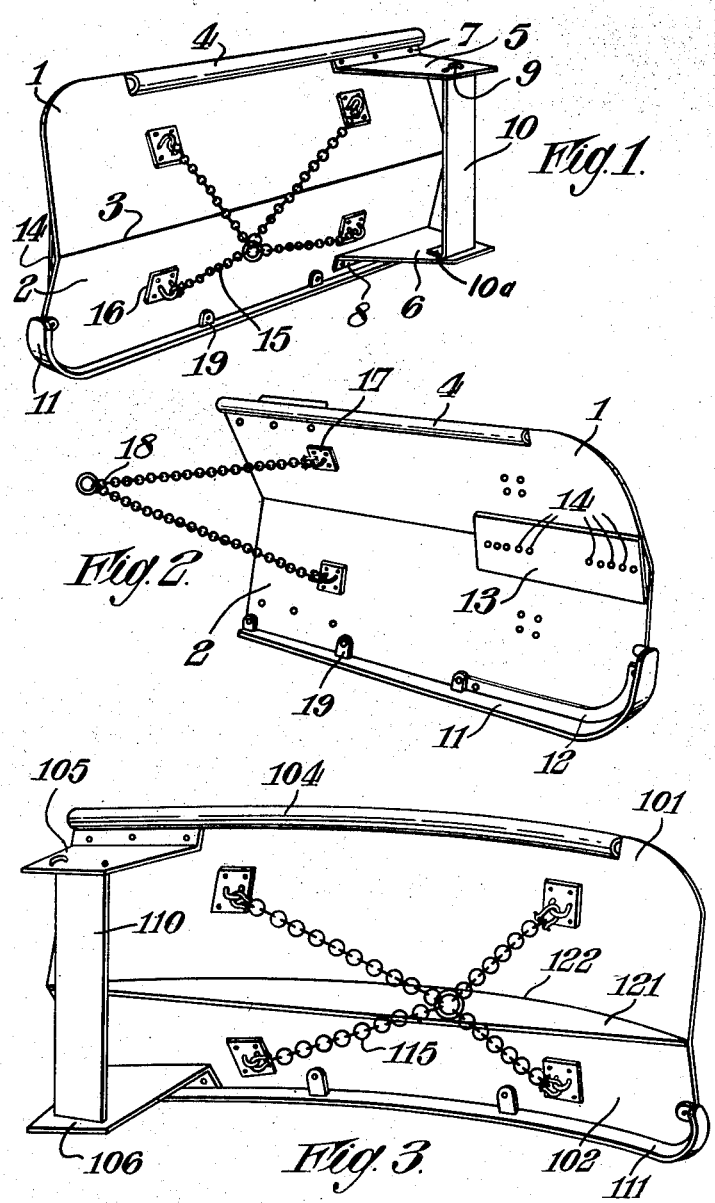

United States Patent Office 2,942,371
Patented June 28, 1960

2,942,371

DUAL-PURPOSE MIDWATER-BOTTOM OTTERBOARD

Wesley W. Johnson, Vancouver, British Columbia, and William E. Barraclough, Nanaimo, British Columbia, Canada, assignors to Canadian Patents and Development Limited, Ottawa, Ontario, Canada, a company Filed Sept. 25, 1958, Ser. No. 763,363

Claims priority, application Canada Oct. 4, 1957

11 Claims. (Cl. 43—9)

The present invention relates to trawling devices known as otterboards, especially useful in deep water fishing although they are capable of use in other connections for example, in minesweeping.

Traditional methods of deep water fishing seek to net fish either near the surface or near the bottom of the water. During recent years, interest has increased in trawling for fish in midwater where it is now realized that large schools of fish may often be found.

As a result of this increased interest considerable experimental work has been done on the problem of keeping the mouth of the net open both vertically and laterally during midwater trawling. To open the mouth of the midwater trawl net vertically, devices have been used ranging from such means, as for example, various types of floats, elevators and kites attached to the headrope for raising the headline, to weights on the lower warps of the two-boat trawls and depressors on the lower sweep lines for lowering the footrope. Otterboards are the standard devices for opening the mouth of the net laterally. Aerofoil otterboards and offset otterboards (doors suspended on a pennant) have been developed and used to replace the conventional rectangular flat otterboard.

None of the modified otterboards known to the applicants have been entirely satisfactory for use in both midwater trawling and bottom trawling.

It is an object of the invention to provide an otterboard which can be used either in midwater, with or without pennants, or can also be used in the conventional bottom trawling method and can be used with single or double towing gear.

It is a further object of the invention to provide an otterboard having good stability in the water and of which the operating depth can be controlled by adjusting the length of warp and the speed of tow.

These and other objects, which will become evident from the following description, are accomplished by providing an otterboard of which the shearing surface (i.e. the surface which faces the direction of tow) is convex about a horizontal shearing edge, said shearing surface being constituted by the surfaces of two plates disposed edgewise to and at an oblique angle to each other.

It is found that such an otterboard exhibits stability when towed through the water at slow speeds, for example about 2 knots, or at high speeds, for example about 6 knots; this stability can apparently be attributed to the longitudinal dihedral of the shearing surface.

The plates of which the otterboard of the invention is comprised may be flat plates disposed edgewise to each other to enclose an angle of longitudinal dihedral; conveniently they may be formed by bending a single flat plate about a longitudinal axis. The junction of the flat plates may constitute a shearing edge for the otterboard.

The oblique angle between the plates may be varied within wide limits. The smaller the angle the more water is permitted to slip over the outer edges of the otterboard and therefore the higher the speed at which the otterboard can be towed. However, as the angle between the plates decreases there is a corresponding decrease in the efficiency of outward thrust. For most purposes, the angle between the plates is from 110° to 170°. Satisfactory performance has been achieved with an otterboard of the invention in which this angle was 110°. When the plates are flat plates, excellent results are obtained using an angle of 140°.

Vertical stability of the otterboards of the invention can be improved by securing a buoyant member, preferably a gas-filled tube, to the outer edge of the plate which is uppermost when the otterboard is under tow. Horizontal stability can be improved by the provision of two horizontal stabilizer fins, one projecting from each of said plates; such fins serve to minimize oscillatory movement of the otterboard. A vertical stabilizing fin may be provided to assist in controlling the angle of attack of the otterboard when under tow; conveniently this can be mounted between the horizontal stabilizing fins, preferably in such a manner that the angle between the vertical stabilizing fins and the otterboard can be adjusted.

The vertical angle of tow can be controlled by attaching a suitable weight of lead ballast to the otterboard preferably at the lower edge thereof. Further, a heavy ballast compartment may be provided rearwardly of the shearing surface preferably centrally of the otterboard.

The otterboards of the invention are intended for use either in midwater or the sea bottom and it is desirable that the lower edge of the otterboard should be reinforced to withstand the severe shocks which are suffered when the otterboard strikes hard rock on the sea bottom. Such reinforcement can be effected by securing a runner member, preferably of armour plate to the outer edge of the lower plate; the runner member may advantageously extend around the lower corner of the forward edge of the otterboard.

The plates of the otterboard are preferably formed of a light alloy which is resistant to corrosion by sea water, for example an aluminum-magnesium alloy.

The plates of which the otterboard is formed need not be flat and in one embodiment of the invention, they have transverse curvature in the nature of aerofoils. An otterboard of this type gives a greater outward thrust than one comprising flat plates, the degree of outward thrust depends on the degree of curvature of the plates.

The otterboards of the invention may, if desired, be constructed with a streamlined forward edge for example by attachment to the forward edge of a suitably shaped member made of heavy hardwood or lead, which also serves as a ballast member or by the provision at the forward edge of plates having such curvature as to produce the desired streamlining.

The gear used for towing and for connecting to the nets the otterboards of the present invention is of conventional type.

The invention will be described by way of example and without limitation with reference to the accompanying drawings in which, Fig. 1 is a perspective front view of one embodiment of the otterboard of the invention, Fig. 2 is a perspective rear view of the otterboard shown in Fig. 1, Fig. 3 is a perspective front view of a second embodiment of the otterboard of the invention, Fig. 4 is a perspective rear view of the otterboard shown in Fig. 3, Fig. 5 is a perspective front view of a modification of the otterboard of Figs. 3 and 4.

The embodiment shown in Fig. 1 is a starboard otterboard and is formed from a flat sheet of aluminum-magnesium alloy resistant to corrosion by sea water and measuring 36 inches by 65 inches, bent along its longitudinal axis to form an upper plate 1 and a lower plate 2, the plates defining a dihedral angle of 140° and the junction of the plates constituting a shearing edge 3 in the middle of the shearing surface presented by the plates 1 and 2.

The top edge of the upper plate 1 is recessed to accommodate a ballast tube 4 welded to said top edge and being filled with air at and capable of withstanding a pressure of up to 20 atmospheres.

An upper horizontal stabilizer fin 5 is secured adjacent the upper edge of the upper plate 1 and a lower horizontal stabilizer fin 6 is secured adjacent the lower edge of the lower plate 2. The stabilizer fins 5 and 6 are secured to the upper and lower plates 1 and 2 by means of flanges 7 and 8, each of said flanges being formed by bending the edges of the stabilizer fins through an angle of 110°.

Slots 9 are provided in the stabilizer fins 5 and 6 for the attachment of a vertical stabilizer fin 10. The fin 10 presents flanges 10a formed by bending the top and bottom edges thereof through an angle of 90° and the fin 10 is attached to the fins 5 and 6 by means of bolts passing through the flanges 10a and the fins 5 and 6; a bolt passes through each of the slots 9, the position of these bolts in the slots 9 determining the angle between the fin 10 and the shearing surface.

A runner 11 is secured by runner lugs 19 to the lower edge of the lower plate 2 and extends around the front corner thereof; the runner is made of armour plate so that it can withstand the severe blows suffered when it strikes the sea bed during bottom trawling.

Secured adjacent the runner 11 is a bar 12 of lead ballast. This serves, together with the air ballast tube 4, to give rough balance to the otterboard in water. The balance can be trimmed by insertion of additional lead ballast into a compartment formed by a ballast retainer plate 13 secured to the plates 1 and 2 rearwardly of the shearing surface. The plate 13 has holes 14 in it through which nails can be driven into a lead ballast member shaped to fit behind the plate and movable into a position to give fine balance to the otterboard.

A conventional galvanized four piece chain towing bridle 15 is secured to the otterboard by means of lug plates 16 bolted to the plates 1 and 2 on the shearing surface. On the other side of the otterboard are secured two lug plates 17 for attachment of the otterboard to the net. In Fig. 2, there is shown secured to the lug plates 17 a two piece chain bridle 18 for use when the otterboard is "hooked up" in the conventional bottom trawling position.

Experimental midwater trawling has been carried out with otterboards as shown in Figs. 1 and 2 using trawlers equipped with double gear (two towing warps) and single gear (one towing warp). In one pair of otterboards, the angle of longitudinal dihedral was 110° and in another pair 140°. Both pairs were found to give superior performance to the typical conventional, flat, heavy, rectangular otterboards. Catches of herring ranging from 2 to 15 tons were made fishing completely in midwater and with the otterboards operating along the sea bottom.

The otterboard illustrated in Figs. 3 and 4 is a port otterboard and comprises an upper plate 101 and a lower plate 102, each secured edgewise to the edge of a flat plate 121 having a curved edge 122. The plates 101 and 102 are transversely curved, their curvature conforming to that of the member 122.

The otterboard is provided with an air ballast tube 104, upper and lower horizontal stabilizer fins 105 and 106, a vertical stabilizer fin 110, a runner 111, a ballast retainer plate 113, a heavy ballast bar 112, a four piece chain towing bridle 115, and a two piece chain bridle 118. All of these pairs are similar to the corresponding parts of the otterboard shown in Figs. 1 and 2 and serve similar purposes so that it is unnecessary for them again to be described in detail.

Tests of the otterboard shown in Figs. 3 and 4 have shown that it develops a greater outward thrust in water than a similar otterboard formed of flat plates. The outward thrust depends on the degree of transverse curvature of the plates 101 and 102 and it is therefore possible to increase or diminish this thrust in accordance with prevailing requirements by varying the curvature of the plates. The flat plate 121 serves not only as a supporting member for the plates 101 and 102 but also contributes to the horizontal stability of the otterboard.

Fig. 5 illustrates a modified version of the otterboard shown in Figs. 3 and 4. For clarity, some of the constructional features of the otterboard have been omitted but it will be understood that when in use the otterboard is provided wih horizontal and vertical stabilizing fins, a runner member and bridles as shown in Figs. 3 and 4.

The otterboard of Fig. 5 differs from the otterboard shown in Figs. 3 and 4 in that the forward edge of the otterboard is streamlined by securing two plates 125 to the plates 101 and 102 and to the plate 121 at the forward edge of the otterboard. The plates 125 have opposite curvature to the curvature of the plates 101 and 102, and offer a diminished resistance to the water flowing over the forward edge of the otterboard. The chambers formed between the plates 125 and the plates 101 and 102 are left open at 127 and 128, respectively so that the water can flow into them. If the chambers were closed in water-tight fashion, there would be a tendency for the forward edge of the otterboard to be floated in water thereby interfering with the function of the otterboard.

Instead of streamlining the forward edge of the otterboard by the attachment of the plates 125, it is possible to attach an appropriately shaped member formed of heavy hardwood (teak) or lead. If lead is used, this minimizes or dispenses with the need for introducing lead ballast into the compartment formed by the ballast retainer plate 113.

We claim:

1. An otterboard comprising two plates disposed edgewise in fixed relationship and at an oblique angle to each other, said plates forming a continuous shearing surface which is convex about a horizontal shearing edge and said plates carrying thereon means for securing a towing bridle to said shearing surface both above and below said shearing edge.

2. An otterboard comprising an upper plate and a lower plate disposed edgewise in fixed relationship to and at an oblique angle to each other, said plates providing continuous shearing surface which is convex about a horizontal shearing edge, a buoyant member attached adjacent the outer edge of one of said plates, and a runner member attached to the outer edge of the other of said plates, said plates carrying thereon means for securing a towing bridle to said shearing surface both above and below said shearing edge.

3. An otterboard comprising two plates disposed edgewise in fixed relationship to and at an oblique angle to each other, said plates providing a continuous shearing surface which is convex about a horizontal shearing edge, and a horizontal stabilizing fin projecting from each of said plates, said plates carrying thereon means for securing a towing bridle to said shearing surface both above and below said shearing edge.

4. An otterboard comprising two plates disposed edgewise in fixed relationship to and at an oblique angle to each other, said plates providing a continuous shearing surface which is convex about a horizontal shearing edge, a horizontal stabilizing fin projecting from each of said plates and a vertical stabilizing fin mounted between said horizontal stabilizing fins, said plates carrying thereon means for securing a towing bridle to said shearing surface both above and below said shearing edge.

5. An otterboard according to claim 1 wherein said oblique angle is from 110° to 170°.

6. An otterboard according to claim 1 wherein said plates are flat plates.

7. An otterboard according to claim 1 wherein said plates are integral with each other and are constituted by a single flat plate bent about a longitudinal axis.

8. An otterboard according to claim 1 in which each of said plates has transverse curvature.

9. An otterboard according to claim 2 having heavy ballast permanently secured thereto adjacent said runner member.

10. An otterboard according to claim 4 having a heavy ballast compartment located rearwardly of said shearing surface.

11. An otterboard according to claim 4 in which the forward edge of the otterboard is streamlined.

References Cited in the file of this patent

UNITED STATES PATENTS

| | | |
|---|---|---|
| 2,816,385 | Luketa | Dec. 17, 1957 |

FOREIGN PATENTS

| | | |
|---|---|---|
| 271,218 | Great Britain | May 26, 1927 |